(12) United States Patent
Liu et al.

(10) Patent No.: US 9,733,822 B2
(45) Date of Patent: Aug. 15, 2017

(54) ELECTRONIC DEVICE AND STATE CONTROLLING METHOD

(71) Applicants: LENOVO (BEIJING) CO., LTD., Beijing (CN); BEIJING LENOVO SOFTWARE, LTD., Haidian District, Beijing (CN)

(72) Inventors: Junfeng Liu, Beijing (CN); Qian Zhao, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 151 days.

(21) Appl. No.: 13/623,371

(22) Filed: Sep. 20, 2012

(65) Prior Publication Data
US 2013/0069897 A1    Mar. 21, 2013

(30) Foreign Application Priority Data

Sep. 20, 2011 (CN) .......................... 2011 1 0280885
Nov. 14, 2011 (CN) .......................... 2011 1 0359417

(51) Int. Cl.
*G06F 3/0488* (2013.01)
*G06F 1/32* (2006.01)
(Continued)

(52) U.S. Cl.
CPC .......... *G06F 3/0488* (2013.01); *G06F 1/3206* (2013.01); *G06F 1/3265* (2013.01);
(Continued)

(58) Field of Classification Search
CPC .............. G06F 3/0488; G06F 3/04883; G06F 2203/04808; G06F 1/3215; Y02B 60/32;
(Continued)

(56) References Cited

U.S. PATENT DOCUMENTS 6,429,625 B1 * 8/2002 LeFevre ................ H02J 7/0047
320/155
7,230,898 B1 * 6/2007 Yokota ................... G11B 19/04
369/53.21
(Continued)

FOREIGN PATENT DOCUMENTS

CN      101566907 A    10/2009
CN      101668351 A     3/2010
(Continued)

OTHER PUBLICATIONS

First Office Action dated Dec. 2, 2014 from corresponding Chinese Application No. CN 201110280885.1 (13 pages including English translation).

(Continued)

*Primary Examiner* — Kumar Patel
*Assistant Examiner* — Sejoon Ahn
(74) *Attorney, Agent, or Firm* — Brinks Gilson & Lione; G. Peter Nichols

(57) ABSTRACT

The present invention provides an electronic device and a state control method. The electronic device includes a display unit having a display state and a turn-off state; a processing unit having an operating state and a sleep state; and a touch sensing unit configured to overlap the display unit, wherein the touch sensing unit detects a first input, which is independent of the states of the processing unit and the display unit. The first input is a touch input, and the touch sensing unit triggers the processing unit and the display unit to perform state switching according to the first input.

12 Claims, 8 Drawing Sheets

(51) Int. Cl.
*H04M 1/67* (2006.01)
*H04W 52/02* (2009.01)

(52) U.S. Cl.
CPC ........... *H04M 1/67* (2013.01); *H04W 52/027* (2013.01); *G06F 2203/04105* (2013.01); *H04M 2250/22* (2013.01); *Y02B 60/1242* (2013.01); *Y02B 60/50* (2013.01)

(58) Field of Classification Search
CPC .............. Y02B 60/34; H04W 52/0254; H04M 2250/22
USPC .................... 345/173; 715/863, 864; 455/411
See application file for complete search history.

(56) References Cited

U.S. PATENT DOCUMENTS

| | | | | |
|---|---|---|---|---|
| 9,240,229 | B1* | 1/2016 | Oh | G11O 5/148 |
| 2002/0026596 | A1* | 2/2002 | Kim | G06F 1/04 |
| | | | | 713/322 |
| 2002/0175634 | A1* | 11/2002 | Ishizuka | G09G 3/3216 |
| | | | | 315/169.1 |
| 2003/0023890 | A1* | 1/2003 | Na | G06F 1/3203 |
| | | | | 713/323 |
| 2003/0105983 | A1* | 6/2003 | Brakmo | G06F 1/3203 |
| | | | | 713/320 |
| 2003/0188204 | A1* | 10/2003 | Tashiro | H02J 7/0013 |
| | | | | 713/300 |
| 2003/0217007 | A1* | 11/2003 | Fukushima | G06Q 30/06 |
| | | | | 705/51 |
| 2004/0063464 | A1* | 4/2004 | Akram | H04W 52/0206 |
| | | | | 455/559 |
| 2004/0193929 | A1* | 9/2004 | Kuranuki | G06F 1/206 |
| | | | | 713/322 |
| 2004/0209655 | A1* | 10/2004 | Kubo | H04B 1/3877 |
| | | | | 455/569.1 |
| 2005/0121979 | A1* | 6/2005 | Matsumoto | H01M 10/441 |
| | | | | 307/66 |
| 2006/0068239 | A1* | 3/2006 | Norimatsu | H01M 8/04544 |
| | | | | 307/64 |
| 2006/0076940 | A1* | 4/2006 | Kawabata | G06F 1/32 |
| | | | | 323/282 |
| 2007/0234078 | A1* | 10/2007 | Nguyen | G06F 1/26 |
| | | | | 713/300 |
| 2007/0276583 | A1* | 11/2007 | Dobeck | G01C 21/20 |
| | | | | 701/490 |
| 2009/0040018 | A1* | 2/2009 | Lee | H04M 1/673 |
| | | | | 340/5.2 |
| 2009/0299691 | A1* | 12/2009 | Shimaoka | G01C 22/006 |
| | | | | 702/160 |
| 2010/0162182 | A1* | 6/2010 | Oh | G06F 3/04883 |
| | | | | 715/863 |
| 2010/0171983 | A1* | 7/2010 | Asakawa | H04N 1/00408 |
| | | | | 358/1.15 |
| 2011/0080367 | A1* | 4/2011 | Marchand et al. | 345/174 |
| 2011/0098019 | A1* | 4/2011 | Fujii | H04M 1/576 |
| | | | | 455/411 |
| 2011/0141052 | A1* | 6/2011 | Bernstein et al. | 345/174 |
| 2011/0221347 | A1* | 9/2011 | Bae | G01R 31/3689 |
| | | | | 315/129 |
| 2011/0254784 | A1* | 10/2011 | Yamada | G06F 1/32 |
| | | | | 345/173 |
| 2011/0267199 | A1* | 11/2011 | Liu | G01R 31/3689 |
| | | | | 340/636.1 |
| 2012/0036378 | A1* | 2/2012 | Lee | G06F 1/263 |
| | | | | 713/320 |
| 2012/0105358 | A1* | 5/2012 | Momeyer | G06F 3/0414 |
| | | | | 345/174 |
| 2012/0191993 | A1* | 7/2012 | Drader et al. | 713/320 |
| 2012/0280917 | A1* | 11/2012 | Toksvig et al. | 345/173 |
| 2012/0299860 | A1* | 11/2012 | Wang | G06F 3/04883 |
| | | | | 345/173 |
| 2013/0069897 | A1* | 3/2013 | Liu | G06F 3/0488 |
| | | | | 345/173 |
| 2013/0165181 | A1* | 6/2013 | Hasegawa | G06F 1/324 |
| | | | | 455/556.1 |
| 2013/0225127 | A1* | 8/2013 | Cavacuiti | H04M 1/67 |
| | | | | 455/411 |
| 2014/0145985 | A1* | 5/2014 | Akai | G06F 1/3215 |
| | | | | 345/173 |
| 2014/0204045 | A1* | 7/2014 | Komoto | G06F 3/044 |
| | | | | 345/173 |
| 2014/0337645 | A1* | 11/2014 | Ware | G06F 1/3275 |
| | | | | 713/320 |

FOREIGN PATENT DOCUMENTS

| | | |
|---|---|---|
| CN | 10175112 A | 6/2010 |
| CN | 101727272 A | 6/2010 |
| CN | 101807106 A | 8/2010 |
| CN | 101917032 A | 12/2010 |
| CN | 102033638 A | 4/2011 |
| KR | 20110004185 A | 1/2011 |

OTHER PUBLICATIONS

First Office Action dated Mar. 20, 2015 from corresponding Chinese Application No. CN 201110359417.3 (26 pages including English translation).
iPhone4 Release downloaded from the Internet at http://wendahaosou.com, on Jun. 11, 2015 with English translation, 2 pgs.
Third Office Action dated Apr. 14, 2016 out of corresponding Chinese Patent Application No. 201110359417.3 (27 pages including English translation).
Second Office Action dated Oct. 19, 2015 out of corresponding Chinese Patent Application No. 201110359417.3 (25 pages including English translation).
Office Action dated Oct. 1, 2015 out of corresponding German Patent Application No. 102012108810.1 (7 pages).

* cited by examiner

300

| THE TOUCH SENSING UNIT DETECTS A FIRST INPUT, WHICH IS INDEPENDENT ON THE STATES OF THE PROCESSING UNIT AND THE DISPLAY UNIT | S301 |

↓

| THE PROCESSING UNIT AND THE DISPLAY UNIT ARE TRIGGERED TO PERFORM STATE SWITCH ACCORDING TO THE FIRST INPUT | S302 |

FIG. 3

ELECTRONIC DEVICE AND STATE CONTROLLING METHOD

This application claims priority to CN 201110280885.1 filed on Sep. 20, 2011 and CN 201110359417.3 filed on Nov. 14, 2011, the entire contents of each are incorporated herein by reference

FIELD OF THE INVENTION

The present invention relates to an electronic device, and a state controlling method applied thereto.

BACKGROUND

At present, various electronic devices such as a cellular phone, a portable music player, a portable computer and a flat-plate computer have been widely used. Generally, these electronic devices comprise a touch sensing unit for receiving inputs of a user so as to facilitate the operation of the user. Movements such as click-on, long-press, dragging, sliding etc. by a user on the touch control zone may bring about corresponding control functions.

In another aspect, a screen lock state has been proposed for present electronic devices for saving power consumption of such devices and avoiding accidental touch thereon by a user at the time when the devices are power on and not being operated. Generally the electronic device may be set to a screen lock state by pressing a button, for example a power button. In the screen lock state, a processing unit (e.g. CPU) of the electronic device may be set to a standby state so that the device does not respond to any touch operation occurred on the touch control zone; a touch screen may also be turned off so that no display or touch detection is performed. When the user wishes to use the electronic device, he or she may remove that lock screen state (hereinafter referred to as "unlock") so that the electronic device will switch back to the normal operating state.

Among many current electronic devices (such as a smart phone, flat-plate computer), to perform an unlock operation, a user needs to press a certain physical button (such as power switch) to turn on the touch screen while drawing a specified pattern in a specified trace on the touch screen to unlock. Such operation is considered to be complicated. Generally, the physical button and the touch screen are set at different outer surfaces of an electronic device and as a result, a user has to operate separately at two different surfaces to unlock, i.e. breaking one operation into two sub-operations. In this case, the electronic device is likely to fall if a user is performing such operations with one hand only.

Furthermore, for example, when the electronic device is in the sleep state, the display unit and touch sensing unit thereof are usually turned off to save battery. For electronic devices without a charging indicator light, when a user wishes to check the progress of charging, he or she may need to take the device and press the physical button (such as power switch) to turn on the display unit in order to check the progress of charging. Similarly, for electronic devices still without a charging indicator light, when such devices are in the power-off and charging state, when a user wishes to check the progress of charge, he or she may need to take the device and press the physical button (such as power switch) to turn on the device and check the progress of charging.

SUMMARY

The present invention aims to provide an electronic device and a state controlling method applied thereto in order to solve the above described issues.

An electronic device is provided according to an embodiment of the invention. The electronic device comprises: a display unit having a display state and a turn-off state; a processing unit having an operating state and a sleep state; and a touch sensing unit configured to overlap the display unit, wherein the touch sensing unit detects a first input, which is independent on the states of the processing unit and the display unit, and triggers the processing unit and the display unit to perform state switching according to the first input.

Furthermore, the electronic device according to an embodiment of the present invention further comprises: a battery configured to enter a charging state, when the display unit is in the turn-off state and an external power source connection has been detected; charging control unit configured to acquire charging progress information of the battery when the display unit is in the turn-off state and when the external power source connection is detected; wherein, when the external power source connection has been detected and the touch sensing unit has detected the first input, the display unit switches from the turn-off state to the display state so as to display the charging progress information of the battery.

A state controlling method being applied to an electronic device is provided by another embodiment of the invention, the electronic device comprises: a display unit, having a display state and a turn-off state; a processing unit, having an operating state and a sleep state; and a touch sensing unit, configured to overlap the display unit. Said state controlling method comprises: the touch sensing unit detecting a first input, where the touch sensing unit detects a first input, which is independent on the states of the processing unit and the display unit, the first input being a touch input; and triggering the processing unit and the display unit to perform state switching according to the first input.

A state controlling method according to yet another embodiment of the invention, wherein the electronic device further comprises a battery and a charging control unit configured to acquire charging progress information of the battery, triggering the processing unit and the display unit to perform state switching according to the first input comprises: the display unit switching from the turn-off state to the display state so as to display the charging progress information of the battery when an external power source connection has been detected and the touch sensing unit has detected the first input.

Provided with the solution described above, a user may conveniently perform a first input on the touch sensing unit to trigger the processing unit and the display unit to perform state switching and in this sense, the unlock operation can be simplified. For example, when the processing unit is in the operating state and the display unit is in the display state, a first input detected by the touch sensing unit may enables state switching where the processing unit switches to the sleep state and the processing unit switches to the turn-off state; or when the processing unit is in the sleep state and the display unit is in the turn-off state, a first input detected by the touch sensing unit may enables state switching where the processing unit switches to operating state and the display unit to the display state without necessarily turning on the display unit. Further, the solution provided by the above-described invention allows the state switching operation such as unlock to occur by detecting an input performed on the touch screen of the electronic device by a user without any need of inputting at two different surfaces of the electronic device and thus easing the state switching of the electronic device for the user, in addition, the device in this case will hardly fall even when it is being operated with one hand only.

Furthermore, when the electronic device is in a sleep or a power-off state, the touch sensing unit may be controlled with the detection of the connection of an external power source and the display unit in the electronic device may display according to the detection result of the touch sensing unit, thus making it convenient to check the progress of charging when said device is in said either state. Particularly, a user can perform such checking with one hand operation even when the electronic device is bulky (in the case of a flat-plate computer). This could be particularly useful when a user can perform such checking with only one hand on a device that is assumed to be bulky.

BRIEF DESCRIPTION OF THE DRAWINGS

FIG. 3 is a flowchart illustrating the state controlling method according to an embodiment of the invention;

DETAILED DESCRIPTION OF THE PREFERRED EMBODIMENTS

The preferred embodiments of the present invention will be described as follows with reference to the accompanying drawings. Please note that, in the description and the accompanying drawings, elements with the similar processes will be designated by the same reference numbers and the repetitive explanation for these processes will be omitted.

Next, an electronic device of an embodiment of the invention will be described with reference to FIG. 1. In the following embodiments of the invention, the specific forms of the electronic device comprise but are not limited to mobile phones, personal computers, digital cameras, personal digital assistants, portable computers, flat-plate computers and game machines etc.

Figure 1:
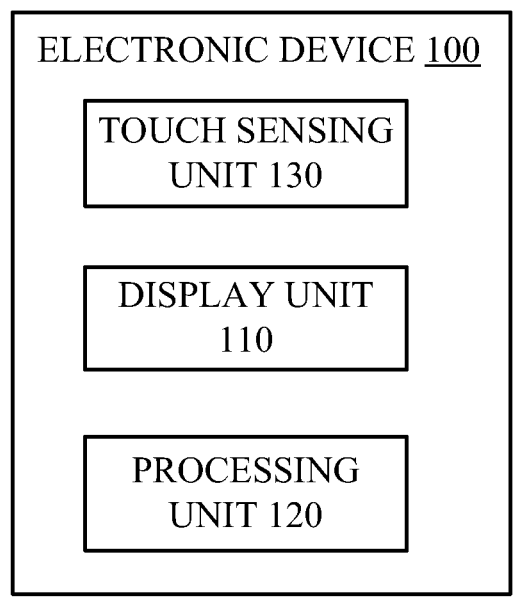
FIG. 1 shows an exemplary structure block diagram of the electronic device according to an embodiment of the invention.

FIG. 1 is an exemplary structure block diagram showing an electronic device 100 according to an embodiment of the invention. As shown in FIG. 1, the electronic device of the embodiment comprises: a display unit 110, a processing unit 120 and a touch sensing unit 130. The display unit 110 has a display state and a turn-off state. The display unit 110 is configured to display to a user in the display state, and to not display to a user in the turn-off state so as to save power consumption of the electronic device.

The processing unit 120 has an operating state and a sleep state. According to an example of the present invention, when the processing unit 120 is in the operating state, the display unit 110 switches to the display state, whereas when the processing unit 120 is in the sleep state, the display unit 110 switches to the turn-off state.

The touch sensing unit 130 is configured to overlap the display unit 110. For example, the touch sensing unit 130 and the display unit 110 may be formed into a touch screen. The touch sensing unit 130 may detect a first input, which is independent on the states of the processing unit 120 and the display unit 110. For example, a touch detection zone may be configured on the electronic device 100, so that the touch sensing unit 130 is capable of detecting the first input in the touch detection zone not only when the processing unit 120 is in the operating state but also when it is in the sleep state. Similarly, the touch sensing unit 130 can detect a first input in the touch detection zone when the display unit 110 is in the display state, and can also detect the first input in the touch detection zone when the display unit 110 is in the turn-off state. The first input may be touch input.

The processing unit 120 and display unit 110 are triggered to perform state switching according to a first input detected by the touch sensing unit 130. The processing unit 120 and the display unit 110 may comprise therein a state controlling module respectively, to switch the state of the processing unit 120 and of the display unit 110 according to a first input detected by the touch sensing unit 130. Alternatively, the electronic device 100 may comprise therein separate state switching unit, to change the state of the processing unit 120 and of the display unit 110 according to a first input detected by the touch sensing unit 130.

According to an example of the invention, the first input may comprise a first touch input. When the processing unit 120 is in the sleep state while the display unit 110 is in the turn-off state, and the touch sensing unit 130 has detected a first input, the processing unit 120 and the display unit 110 may be triggered to perform state switching so that the processing unit switches from the sleep state to the operating state, and the display unit switches from the turn-off to the display state. Alternatively, when the processing unit 120 is in the operating state while the display unit 110 is in the display state, and the touch sensing unit 130 has detected a first input, the processing unit 120 and the display unit 110 may be triggered to perform state switching so that the processing unit switches from the operating state to the sleep state, and the display unit switches from the display to the turn-off state.

According to the electronic device in the embodiment, a user may conveniently perform a first input on the touch sensing unit to trigger the processing unit and the display unit to perform state switching and in this sense, the unlock operation can be simplified. Further, the solution provided by the above-described invention allows the state switching operation such as unlock to be performed by detecting an input on the touch screen of the electronic device by a user without any need of inputting at two different surfaces of the electronic device and thus easing the state switching of the electronic device for the user, in addition, the device in this case will hardly fall even when it is being operated with one hand only.

Furthermore, according to an example of the invention, the electronic device 100 may further comprise a first trace determination unit (not shown). When the processing unit 120 is in the sleep state while the display unit 110 is in the turn-off state and the touch sensing unit 130 has detected a first touch input, the first trace determination unit may determine whether the first input trace of the first touch input matches a first switching trace. If it has been determined by the first trace determination unit that the first input trace matches the first switching trace, the processing unit 120 will switch from the sleep state to the operating state and the display unit 110 from the turn-off state to the display state.

The above-described first switching trace may be preset and saved for the electronic device according to the example. When the processing unit is in the sleep state while the display unit is in the turn-off state, and a user has performed a first touch input to unlock, in this case other than having the display turned on as occurred in the current electronic devices, the lock screen pattern for indicating the unlock swipe will not be displayed, therefore serving as encryption at some point. In the electronic device according to the example, after it is successfully unlocked, the screen will light up and the operating system can be accessed.

Alternatively, according to another example of the invention, when the processing unit 120 is in the operating state while the display unit 110 is in the display unit and the touch sensing unit 130 has detected the first touch input, the first trace determination unit may determine whether the first input trace of the first touch input matches a third switching trace which is identical to and/or different from the first switching trace. If it has been determined by the first trace determination unit that the first input trace matches the third switching trace, the processing unit 120 will switch from the operating state to the sleep state, and the display unit 110 from the display state to the turn-off state.

Further, according to another example of the invention, the first input may further comprise a second touch input. The operating state of the processing unit 120 may comprise a first sub-operating state and a second sub-operating state. The processing unit 120 executes a command of a first command set in the first sub-operating state and executes a command of a second command set in the second sub-operating state, with the number of the commands in the first command set being smaller than that in the second command set. For example, the processing unit 120 may control the display unit 110 to display lock screen interface in the first sub-operating state. If within a predetermined period of time, no further operation of the user has been detected, the processing unit 120 may switch from the first sub-operating state back to the sleep state. If within a predetermined period of time, a further operation of the user is detected, the processing unit 120 may switch from the first sub-operating state to the second sub-operating state. The processing unit 120 may control the display unit 110 to display a corresponding operation interface in the second sub-operating state and perform processing according to the input of the user.

Specifically, when the processing unit 120 is in the sleep state while the display unit 110 is in the turn-off state and the touch sensing unit 130 has detected a first touch input, the processing unit 120 switches from the sleep state to the first sub-operating state and the display unit 110 switches from the turn-off state to the display state so as to display the lock screen interface. If within a predetermined period of time, a second touch input is detected by the touch sensing unit 130, the processing unit 120 will switch from the first sub-operating state to the second sub-operating state and control the display unit 110 to display the corresponding operation interface.

Furthermore, according to yet another embodiment of the invention, the electronic device 100 may further comprises a second trace determination unit (not shown). As described above, when the processing unit 120 is in the sleep state while the display unit 110 in the turn-off state, and the touch sensing unit 130 has detected a first touch input, the processing unit 120 switches from the sleep state to the first sub-operating state and the display unit 110 switches from the turn-off state to the display state so as to display the lock screen interface. Within a predetermined period of time after the lock screen interface is display on the display unit 110, when a second touch input is detected by a touch sensing unit 130, the second trace determination unit will determine whether the second input trace of the second touch input matches a second switching trace. When the second trace determination unit has determined that the second input trace matches the second switching trace, the processing unit 120 switches from the first sub-operating state to the second sub-operating state, and the processing unit 120 controls the display unit 110 to display corresponding operation interface. Otherwise, when the second trace determination unit has determined that within a predetermined period of time no second input trace matching the second switching trace is present, the processing unit 120 switches from the first sub-operating state back to the sleep state and the display unit 110 switches from the display state back to the turn-off state.

Although in the electronic device of the above-described embodiment of the invention, the display unit and the touch sensing unit are configured to overlap, for example are formed into a touch screen, the touch sensing unit may detect the touch input of the user separately from the on/off state (display/turn off state) of the display unit. In addition, the touch sensing unit may also detect the touch input of the user separately from the state (for example, being operating or sleep) of the processing unit.

A conventional touch screen may respond quickly to simultaneous and multi-point touch. However, this relies on an electrode grid and results in power consumption as long as the screen is turned on: the bigger the screen is the more electrical energy a capacitive sensor will consume. Therefore, according to an example of the invention, a Quantum Tunneling Composite (QTC) technique may be employed. In a touch sensing unit where the QTC technique is employed, a layer of composite material composed of conductive particles is sandwiched between two layers of glass-like material. When the upper layer glass is pressed by a finger or a stylus, the particles of the composite material will conduct according to the pressure applied with current flowing through. Opposite to the capacitive screen, this system only consumes power on touching. In another aspect, a touch sensing unit having employed the QTC technique is more durable than a resistance-type touch screen. Other than requiring an air gap less than 1 mm in the resistance-type screen, the gap of the touch screen unit with the QTC technique could be much smaller.

An electronic device according to another embodiment of the invention will now be described with reference to FIG. 2. In the following embodiments of the invention, the specific forms of the electronic device comprise but are not limited to mobile phones, personal computers, digital cameras, personal digital assistants, portable computers, flat-plate computers and game machines etc.

Figure 2:
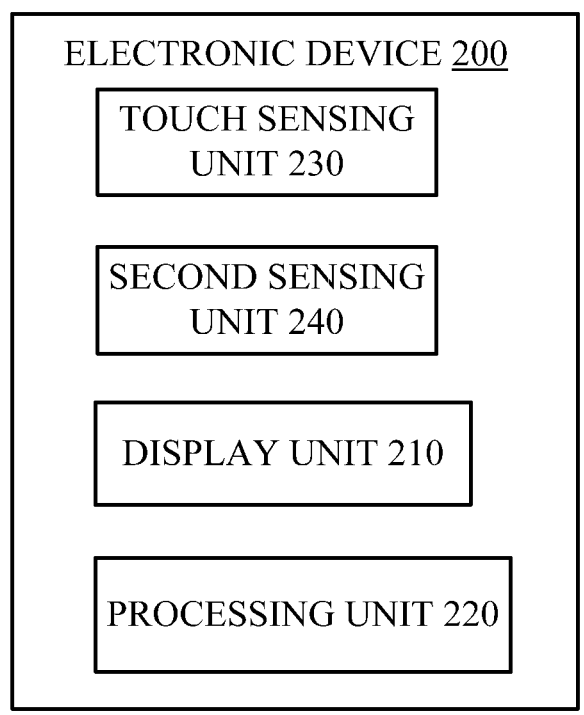
FIG. 2 shows an exemplary structure block diagram of the electronic device according to another embodiment of the invention.

FIG. 2 is an exemplary structure block diagram showing the electronic device 200 according to an embodiment of the invention. As shown in FIG. 2, similar to the electronic device 100, the electronic device 200 of the embodiment comprises of: a display unit 210, a processing unit 220 and a touch sensing unit 230. The display unit 210 has a display state and a turn-off state. The display unit 210 is configured to display to a user in the display state and to not display to a user in the turn-off state so as to save power consumption of the electronic device.

The processing unit 220 has an operating state and a sleep state. According to an example of the invention, when the processing unit 220 is in the operating state the display unit 210 switches to the display unit, while when the processing unit 220 is in the sleep state the display unit 210 switches to turn-off state.

The touch sensing unit 230 is configured to overlap display unit 210. For example, the touch sensing unit 230 and the display unit 210 may be formed into a touch screen. Further, in the embodiment, the touch sensing unit 230 is configured on the first outer surface of the electronic device.

The touch sensing unit 230 may detect a first input, which is independent on the states of the processing unit 220 and the display unit 210. For example, a touch detection zone may be configured on the electronic device 100, the touch sensing unit 230 may detect a first input in the touch detection zone not only when the processing unit 220 is in the operating state but also when the processing unit is in the sleep state. Similarly, when the display unit 210 is in the display state, the touch sensing unit 230 may detect the first input in the touch detection zone, in addition, when the display unit 210 is in the turn-off sate, the touch sensing unit 230 may also detect the first input in the touch detection zone. The first input may be touch input.

Furthermore, the electronic device 200 further comprises a second sensing unit 240. The second sensing unit 240 may detect a second input on the first outer surface separately from the states of the processing unit 220 and the display unit 210. The processing unit 220 and the display unit 210 are triggered to perform state switching according to the first input detected by the touch sensing unit 230 and the second input detected by the second sensing unit 240.

According to an example of the invention, the second input may be a press input. The second sensing unit 240 may be a pressure detection unit. The pressure detection unit may detect the pressure that is applied to the touch sensing unit by a press input, which is independent on the states of the processing unit 220 and the display unit 210. The processing unit 220 and the display unit 210 are triggered to perform state switching according to the first input and the pressure that is applied to the touch sensing unit by a press input.

For example, the touch sensing unit 230 may comprise a touch panel. When a user performs touch input on the touch panel while pressing the touch panel, the pressure detection unit may detect whether the pressure corresponding to the press operation on the touch panel has reached a predetermined value. If the pressure has reached the predetermined value, the processing unit 220 and the display unit 210 are triggered to perform state switching.

For example, the second sensing unit 240 may comprises a job button configured under the touch panel. At least part of the touch panel may move in relation to the housing of the electronic device so as to touch and press the job button. When a user press the touch panel and the job button is touched and pressed, if it is determined that the pressure has reached the predetermined value, the processing unit 220 and the display unit 210 are triggered to perform state switching.

According to the electronic device in the embodiment, a user may conveniently perform a first input on the touch sensing unit to trigger the processing unit and the display unit to perform state switching and in this sense, the unlock operation can be simplified. Further, the solution provided by the above-described invention allows the state switching operation such as unlock to be performed by detecting an input on the touch screen of the electronic device by a user without any need of inputting at two different surfaces of the electronic device and thus easing the state switching of the electronic device for the user, in addition, the device in this case will hardly fall even when it is being operated with one hand only.

Now, the state controlling method of an embodiment of the invention will be described with reference to FIG. 3. FIG. 3 is a flow chart illustrating the method 300 of the controlling the state according to an embodiment of the invention. Said electronic device comprises of: a display unit, a processing unit and a touch sensing unit. The display unit 110 has a display state and a turn-off state.

The display unit is configured to display to a user in the display state, and to not display to the user in the turn-off state so as to save the power consumption of the electronic device. The processing unit has an operating state and a sleep state. According to an example of the invention, when the processing unit is in the operating state the display unit switches to the display state, while when the processing unit is in the sleep state the display unit switches to the turn-off state. The touch sensing unit is configured to overlap the display unit. For example, the touch sensing unit and the display unit may be formed into a touch screen. Each step of the method 300 of controlling the state may be performed by a respective module in the electronic device 100 as described above, so for sake of simplicity, it will not be described in details.

For example, at S301 of FIG. 3, the touch sensing unit may detect a first input, where the touch sensing unit detects the first input, which is independent on the states of the processing unit and the display unit. The first input may be a touch input. For example, a touch detection zone may be configured on the electronic device, the touch sensing unit may detect the first input in the touch detection zone not only when the processing unit is in the operating state but also when it is in the sleep state. Similarly, when the display unit is in the display state, the touch sensing unit may detect the first input in the touch sensing zone, in addition, when the display unit is in the turn-off state, the touch sensing unit may also detect the first in put in the touch sensing zone.

Then, at S302, the processing unit and the display unit are triggered to perform state switching according to the first input. According to an embodiment of the invention, the first input may comprise a first touch input. When the processing unit is in the sleep state while the display unit is in the turn-off state, and the first touch input has been detected by the touch sensing unit, at S302, the processing unit and the display unit may be triggered to perform state switching, so that the processing unit switches from the sleep state to the operating state and the display unit switches from the turn-off state to the display state. Alternatively, when the processing unit is in the operating state while the display unit is in the display state, and the touch sensing unit has detected a first input, at S302, the processing unit and the display unit may be triggered to perform state switching so that the processing unit switches from the operating state to the sleep state, and the display unit switches from the display to the turn-off state.

According to the state controlling method in the embodiment, a user may conveniently perform a first input on the touch sensing unit to trigger the processing unit and the display unit to perform state switching and in this sense, the unlock operation can be simplified. Further, the solution provided by the above-described invention allows the state switching operation such as unlock to be performed by detecting an input on the touch screen of the electronic device by a user without any need of inputting at two different surfaces of the electronic device and thus easing the state switching of the electronic device for the user, in addition, the device in this case will hardly fall even when it is being operated with one hand only.

Furthermore, according to an embodiment of the invention, the method 300 may further comprises the step of determining whether a first input trace of the first touch input matches a first switching trace when the processing unit is in the sleep state while the display unit is in the turn-off state and a first input has been detected by the sense touching unit. When it is determined that the first input trace matches the first switching trace, at S302, the processing unit switches from the sleep state to the operating state and the processing unit switches from the turn-off state to the display state.

Figure 4:
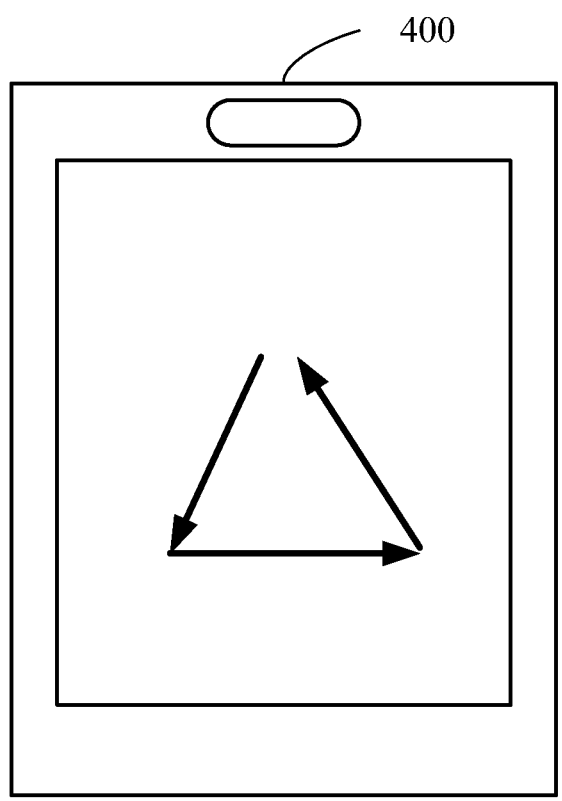
FIG. 4 is an illustrative diagram showing an example of the first input trace according to an embodiment of the invention.
Figure 5:
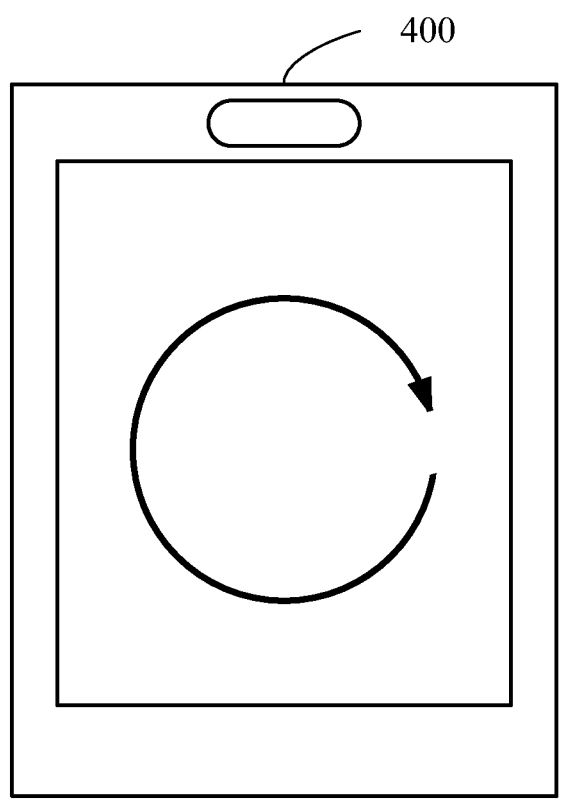
FIG. 5 is an illustrative diagram showing an example of the first input trace according to another embodiment of the invention.
Figure 6:
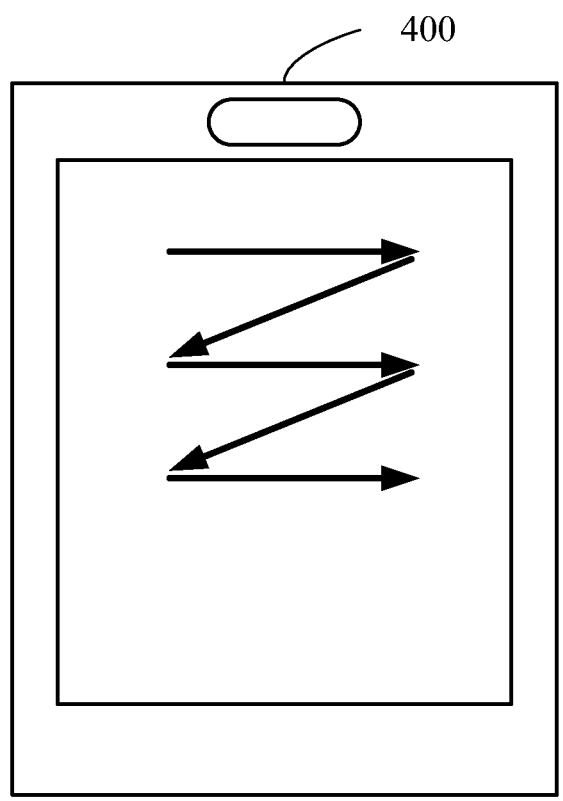
FIG. 6 is an illustrative diagram showing an example of the first input trace according to yet another embodiment of the invention.

Said first switching trace may be preset and saved. FIG. 4 is an illustrative diagram showing an example of the first input trace according to an embodiment of the invention. FIG. 5 is an illustrative diagram showing an example of the first input trace according to another embodiment of the invention. FIG. 6 is an illustrative diagram showing an example of the first input trace according to yet another embodiment of the invention. As shown in FIG. 4, the first switching trace may be preset as a triangle shaped trace at the touch sensing unit 400. When it is determined that the first input trace corresponding to the first input in the touch sensing unit 400 matches the triangle shaped trace as shown in FIG. 4, at S302, the processing unit and the display unit may be triggered to perform state switching. Further, as shown in FIG. 5, the first switching trace may be preset as a circle shaped trace at the touch sensing unit 400. When it is determined that the first input trace corresponding to the first input in the touch sensing unit 400 matches the circle shaped trace as shown in FIG. 5, at S302, the processing unit and the display unit may be triggered to perform state switching. Alternatively, as shown in FIG. 6, the first switching trace may be preset as a zigzag shaped trace at the touch sensing unit 400. When it is determined that the first input trace corresponding to the first input in the touch sensing unit 400 matches the zigzag shaped trace as shown in FIG. 6, at S302, the processing unit and the display unit may be triggered to perform state switching.

According to the state controlling method in the example, when the processing unit is in the sleep state and the display unit is in the turn-off state, and a user has performed a first touch input to unlock, in this case other than having the display turned on as occurred in the current electronic devices, the lock screen pattern for indicating the unlock path will not be displayed, therefore serving as encryption at some point. In the electronic device according to the example, after it is successfully unlocked, the screen will light up and the operating system can be accessed.

Alternatively, according to another example of the invention, when the processing unit is in the operating state while the display unit is in the display state, and the touch sensing unit has detected a first touch input, at S302, it may be determined whether the first input trace of the first touch input matches a third switching trace which is identical to and/or different from the first switching trace. If it has been determined that the first input trace matches the third switching trace, then the processing unit will switch from the operating state to the sleep state, and the display unit switches from the display state to the turn-off state.

Additionally, according to yet another example of the invention, the first input may further comprise a second touch input. The operating state may comprise a first sub-operating state and a second sub-operating state. The processing unit executes a command of a first command set in the first sub-operating state and executes a command of a second command set in the second sub-operating state, with the number of the commands in the first command set being smaller than that in the second command set. For example, the processing unit may control the display unit to display lock screen interface in the first sub-operating state. If within a predetermined period of time, no further operation of the user has been detected, the processing unit may switch from the first sub-operating state back to the sleep state. If within a predetermined period of time, a further operation of the user is detected, the processing unit may switch from the first sub-operating state to the second sub-operating state. The processing unit may control the display unit to display a corresponding operation interface in the second sub-operating state and perform processing according to the input of the user.

Specifically, at S302, when the processing unit is in the sleep state while the display unit is in the turn-off state and the touch sensing unit has detected a first touch input, the processing unit switches from the sleep state to the first sub-operating state and the display unit switches from the turn-off state to the display state so as to display the lock screen interface. If within a predetermined period of time, a second touch input is detected by the touch sensing unit, the processing unit will switch from the first sub-operating state to the second sub-operating state and control the display unit to display the corresponding operation interface.

Further, according to yet another example of the invention, as described above, when the processing unit is in the sleep state while the display unit is in the turn-off and the touch sensing unit has detected the first touch input, the processing unit switches from the sleep state to the first sub-operating state and the display unit switches from the turn-off state to the display state so as to display the lock screen interface. At this time, within a predetermined period of time, the process of switching the processing unit from the first sub-operating state to the second sub-operating state and controlling the display unit to display corresponding operation interface when a second input has been detected by the touch sensing unit comprises of: within a predetermined period of time, while detecting the second touch input by the touch sensing unit, determine whether the second input trace of the second touch input matches the second switching trace; and when it has been determined that the second input trace matches the second switching trace, the processing unit switches from the first sub-operating state to the second sub-operating state and controls the display unit to display corresponding operation interface. Otherwise, when a second trace determination unit has determined that within a predetermined period of time no second input trace matching the second switching trace is present, the processing unit switches from the first sub-operating state back to the sleep state, and the display unit switches from the display state back to the turn-off state.

In the above, an electronic device and state controlling method applied thereto have been described with reference to FIG. 1 to FIG. 6. Furthermore, the state controlling method of the electronic device according to an embodiment of the invention may also apply where the electronic device is in the sleep state or in the power-off state and after the battery of the devices has passed into the charging state, controlling the display unit to switch to display state according to the detection of the touch sensing unit in order to display the charging progress information of the battery. This embodiment of application will be described in details as follows.

Figure 7:
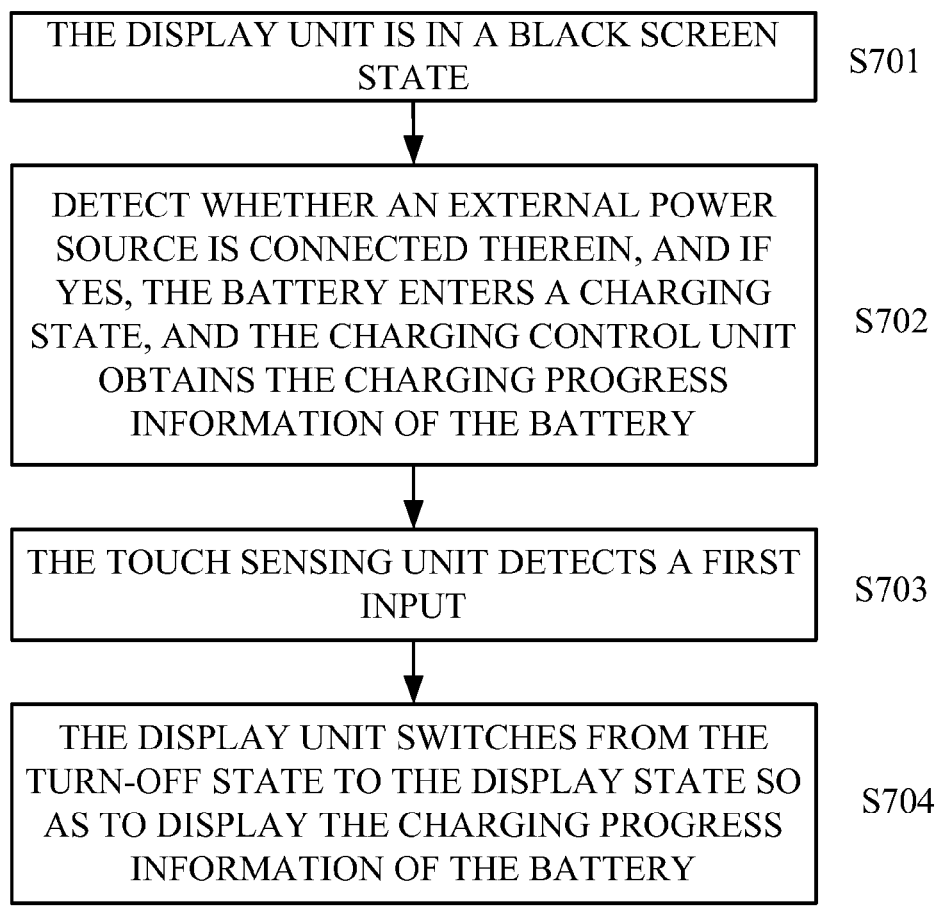
FIG. 7 is a flow chart demonstrating the state controlling method according to another embodiment of the invention.

FIG. 7 is a flow chart demonstrating the state controlling method according to another embodiment of the invention.

As shown in FIG. 7, at S701, the display unit is in the black screen state i.e. the display unit is turned off. According to an example of the invention, the display unit may be in the black screen state when the electronic device is in the sleep state or the power-off state.

When display unit is in the black screen state, steps S702 and S703 may be performed. Specifically, at S702, it is detected whether an external power source is connected thereto, and if yes, the battery passes into a charging state, i.e., the battery of the electronic device is being charged by the external power source. In addition, a charging control unit/charge controller unit acquires the charging progress information of the battery. At S703, it is determined whether the touch sensing unit has detected a first input. The first input has been described with reference to FIGS. 1 to 6 and will not be repeated in details here. In the end, at S704, when said first input has been detected, the display unit is controlled to switch from the turn-off state to the display state so as to display the charging progress information of the battery.

According to an example of the invention, when the electronic device is in the sleep state or the power-off state with no external power source connected, the display unit, the touch sensing unit and the charging control unit may be in the turn-off state. When it is detected that an external power source is being connected, the display unit, the touch sensing unit and the charging control unit of the electronic device may be initialized by the processing unit so that when the battery of the electronic device is being charged by the external power source, the charging progress information of the battery may be acquired by the charging control unit in real-time according to the step S702 of the state controlling method as shown in FIG. 7, and the touch sensing unit detects the presence of a first input thereon so as to control the display unit according to the detection result of the touch sensing unit, according to the step S703 as shown in FIG. 7.

According to another example of the invention, when the electronic device passes into the sleep state, the processing unit of the device may operate/run at a frequency lower than the normal operating frequency. Specifically, when the electronic device passes into the sleep state with no external power source being connected in, the processing unit of the device passes into the sleep state. Once an external power source connection is detected and when the user has not yet switched the electronic device from the sleep state to the normal operating state, the operating frequency of the device may be set to a value which is higher than that of the processing unit in the sleep state but lower than that of the processing unit in the normal operating state. When the processing unit is in the sleep state, if an external power source is detected to be connected, the processing unit can operate at the set frequency.

Furthermore, according to yet another example of the invention, when the electronic device is in the power-off state, the processing unit of the device may operate at a frequency lower than the normal operating frequency. Specifically, when the electronic device is in the power-off state with no external power source being connected in, the processing unit of the device may cease to operate. Once an external power source connection is detected and when the user has not yet switched the electronic device to the normal operating state, the operating frequency of the device may be set to a value which is lower than that of the processing unit in the normal operating state. When the processing unit is in the turn-off state, if an external power source is detected to be connected, the processing unit can operate at the set frequency.

Furthermore, according to yet another example of the invention, when an external power source is detected to be connected and no touch operation has been detected after a predetermined period of time, the processing unit may enter the above sleep state so as to save power consumption.

Furthermore, according to an alternative example of the invention, the electronic device may further comprise a micro-processing unit. When the electronic device is in the power-off state and no external power source is connected, the display unit, the touch sensing unit and the charging control unit may be in the turn-off state and cease to operate. When it is detected that an external power source is being connected, the display unit, the touch sensing unit and the charging control unit of the electronic device may be initialized by the micro-processing unit so that when the battery of the electronic device is being charged by the external power source, the charging progress information of the battery may be acquired via the charging control unit in real-time according to the step S702 as shown in FIG. 7, and the touch sensing unit detects whether the first input has been performed thereon so as to control the display unit according to the detection result of the touch sensing unit, according to the step S703 as shown in FIG. 7. Meanwhile, at the time when the user has not yet switched the electronic device from the power-off state to the turn-on state, the processing unit may maintain the turn-off state and cease to operate.

In another aspect, as described above, when the electronic device is in the power-off state and no external power source is connected, the display unit, touch sensing unit and the charging control unit may be in the turn-off state and the processing unit of the electronic device passes into the sleep state. When it is detected that an external power source is being connected, the processing unit may operate at a frequency higher than that of the processing unit in the sleep state but lower than that of the processing unit in the normal operating state. In addition, the display unit, the touch sensing unit and the charging control unit of the electronic device may be initialized by the processing unit so that when the battery of the electronic device is being charged by the external power source, the charging progress information of the battery may be acquired by the charging control unit in real-time according to the step S702 as shown in FIG. 7, and the touch sensing unit detects the presence of a first input thereon so as to control the display unit according to the detection result of the touch sensing unit, according to the step S703 as shown in FIG. 7.

Alternatively, when the electronic device is in the sleep state and the processing unit is in the sleep state, when an external power source is detected to be connected, the display unit, the touch sensing unit and the charging control unit may be initialized by the micro-processing unit while the state of the processing unit is maintained.

With the state controlling method of the embodiments of the invention, when the electronic device is in a sleep or a power-off state, the touch sensing unit may be controlled with the detection of the connection of an external power source, and the display unit in the electronic device may display according to the detection result of the touch sensing unit, thus making it convenient to check the progress of charging when said device is in said either state. In particular, a user is allowed to perform such checking with one hand operation on an electronic device which is bulky (in the case of a flat-plate computer).

Figure 8:
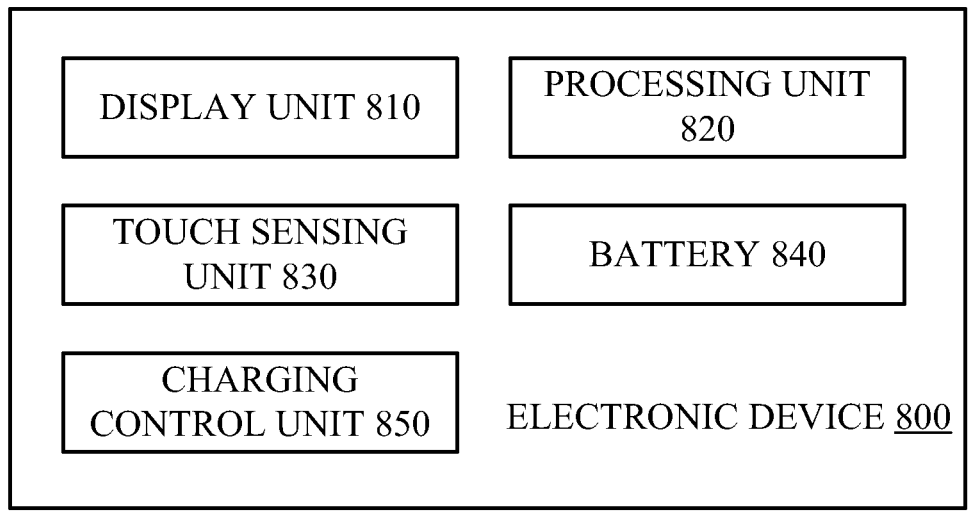
FIG. 8 shows an exemplary structure block diagram of the electronic device according to another embodiment of the invention.

FIG. 8 is an exemplary structure block diagram showing the electronic device according to another embodiment of the invention. As shown in FIG. 8, the electronic device of the embodiment may comprise a display unit 810, a processing unit 820, a touch sensing unit 830, a battery 840 and a charging control unit 850. Each step/function of the state controlling method in the FIG. 7 may be performed by a respective unit in the electronic device 800, so for sake of simplicity, it will not be described again in details.

For example, the state of the display unit 810 may comprise a turn-off state and a display state. According to an example of the invention, when the electronic device is in the sleep state or in the power-off state, the display unit may be in the turn-off state.

When the display unit 810 is in the turn-off state, on detecting an external power source connection, the battery 840 may enter a charging state, i.e., the battery of the electronic device is being charged by the external power source, and the charging progress information of the battery may be acquired via the charging control unit.

In addition, when the display unit 810 is in the turn-off state, the touch sensing unit 830 may detect whether a first input has been performed on the touch sensing unit. When the touch sensing unit 830 has detected the presence of touch operation as the first input, the display unit 810 may be controlled to switch from the turn-off state to the display state so as to display the charging progress information of the battery.

In addition, when the electronic device is in the sleep state or power-off state with no external power source being connected, the display unit 810, the touch sensing unit 830 and the charging control unit 850 may be in the turn-off state. When it is detected that an external power source is being connected, the display unit 810, the touch sensing unit 830 and the charging control unit 850 of the electronic device may be initialized by the processing unit 820 so that when the battery 840 of the electronic device is being charged by the external power source, the charging progress information of the battery 840 may be acquired via the charging control unit in real-time, and the touch sensing unit 830 detects whether a touch operation as the first input has been performed thereon. Specifically, on detecting the presence of the first input by the touch sensing unit 830, the display unit 810 may be controlled to switch from the turn-off state to the display state so as to display the charging progress information of the battery.

With the state controlling method of the embodiments of the invention, when the electronic device is in a sleep or a power-off state, the touch sensing unit may be controlled with the detection of the connection of an external power source, and the display unit in the electronic device may display according to the detection result of the touch sensing unit, thus making it convenient to check the progress of charging when said device is in said either state. In particular, a user is allowed to perform such checking with one hand operation on an electronic device which is bulky (in the case of a flat-plate computer).

Figure 9:
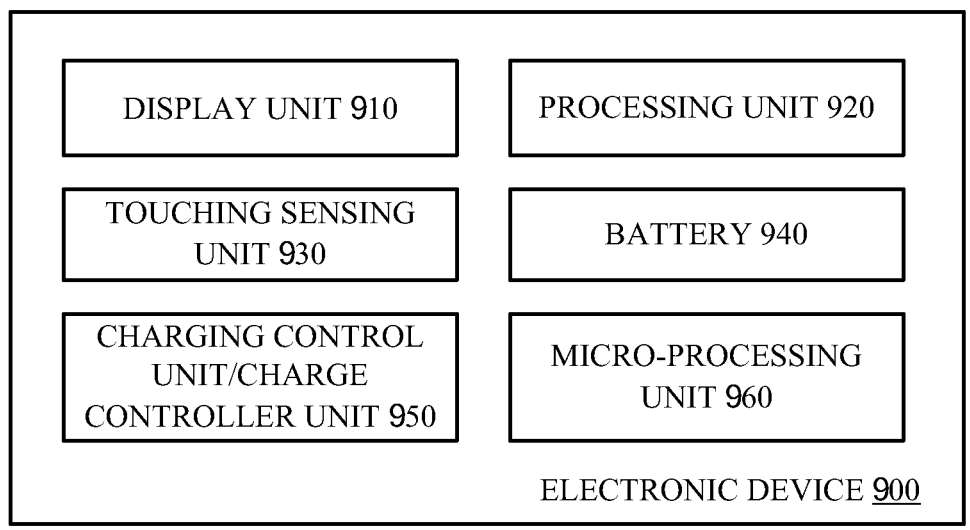
FIG. 9 shows an exemplary structure block diagram of the electronic device according to yet another embodiment of the invention.

Next, the electronic device according to yet another embodiment of the invention will be described with reference to FIG. 9. The electronic device 900 comprises a display unit 910, a processing unit 920, a touch sensing unit 930, a battery 940 and a charging control unit 950. In addition, the electronic device 900 further comprises a micro-processing unit 960.

The state of the display unit 910 may comprise a display state and a turn-off state. According to an example of the invention, when the electronic device is in the sleep state or the power-off state, the display unit 910 may be in the turn-off state.

When the electronic device is in the power-off state and no external power source is connected, the display unit 910, the touch sensing unit 930 and the charging control unit 950 may be in the turn-off state and cease to operate. When it is detected that an external power source is being connected, the display unit 910, the touch sensing unit 930 and the charging control unit 950 of the electronic device may be initialized by the micro-processing unit 960 so that when the battery 940 of the electronic device is being charged by the external power source, the charging progress information of the battery 940 may be acquired via the charging control unit in real-time, and the touch sensing unit 930 detects whether a first input has been performed thereon so as to control the display unit 910 according to the detection result of the touch sensing unit 930. Meanwhile, at the time when the user has not yet switched the electronic device from the power-off state to the turn-on state, the processing unit may maintain the turn-off state and cease to operate.

In another aspect, as described above, when the electronic device is in the sleep state and no external power source is connected, the display unit 910, touch sensing unit 930 and the charging control unit 950 may be in the turn-off state and the processing unit of the electronic device passes into the sleep state. When it is detected that an external power source is being connected, the processing unit 920 may operate at a frequency higher than that of the processing unit 920 in the sleep state but lower than that of the processing unit 920 in the normal operating state. In addition, the display unit 910, the touch sensing unit 930 and the charging control unit 950 of the electronic device may be initialized by the processing unit 920 so that when the battery of the electronic device is being charged by the external power source, the charging progress information of the battery may be acquired via the charging control unit 950 in real-time, and the touch sensing unit 930 detects whether a touch operation as the first input has been performed thereon so as to control the display unit 910 according to the detection result of the touch sensing unit 930.

Alternatively, when the electronic device is in the sleep state and the processing unit 920 is in the sleep state, when an external power source is detected to be connected, the display unit 910, the touch sensing unit 930 and the charging control unit 950 may be initialized by the micro-processing unit 960 while the state of the processing unit is maintained. It is perceivable for an ordinary person skilled in the art that this invention may be achieved in the means of electronic hardware, computer software or the combination of the two based on the units and algorithm steps of each example described in the disclosed embodiments. To clearly illustrate that the hardware and software are exchangeable, the component and steps of each examples have been described in a functional general manner. Whether these functions being performed in the manner of hardware or software will depend on the specific applications of the technical solution and the design constraint. A technical specialist may employ different methods to achieve the functions as described for each specific application and shall not be considered as going beyond the scope of the invention.

Although some embodiments of the invention have been shown and described, those skilled in the art shall appreciate that various modifications may be made to these embodiment without departing from the principle and spirit of the invention, and such modification are supposed to fall in the scope of the invention.

What is claimed is:

1. An electronic device comprises:
a display having a display state and a turn-off state;
a processor having an operating state and a sleep state; and
a touch panel configured to overlap the display, wherein
the touch panel detects a first input, when the display is in the turn-off state, which is independent on the states of the processor and the display, and the first input is a touch input with a first input trace to be compared with a plurality of switching traces, and
the touch panel triggers the processor and the display to perform a state switching according to the first input, wherein the first input comprises a first touch input, and when the processor is in the sleep state while the display is in the turn-off state and the touch panel has detected the first touch input, the processor switches from the sleep state to the operating state and the display switches from the turn-off state to the display state,
wherein the first input further comprise a second touch input,
the operating state comprise a first sub-operating state and a second sub-operating state,
when the processor is in the sleep state while the display is in the turn-off state and the touch panel has detected the first touch input, the processor switches from the sleep state to the first sub-operating state and the display switches from the turn-off state to the display state so as to display a lock screen interface; and
when the touch panel has detected the second touch input within a predetermined period of time, the processor switches from the first sub-operating state to the second sub-operating state and controls the display to display a corresponding operation interface,
wherein the processor executes a command of a first command set in the first sub-operating state and executes a command of a second command set in the second sub-operating state, and the number of the commands in the first command set is smaller than that in the second command set,
wherein when the electronic device is in the sleep state or in the power-off state, the display is in the turn-off state,
wherein when an external power source connection is detected, the processor initializes the display, the touch panel and the charging controller of the electronic device, and
wherein when the electronic device is in the sleep state, the processor operates at a frequency lower than the normal operating frequency.

2. The electronic device according to claim 1, further comprises: a trace determination coprocessor configured to determine whether the first input trace of the first touch input matches the first switching trace when the processor is in the sleep state while the processor is in the turn-off state and the touch panel has detected the first touch input; and when the trace determination coprocessor has determined that the first input trace matches the first switching trace, the processor switches from the sleep state to the operating state and the display switches from the turnoff state to the display state.

3. The electronic device according claim 1, further comprises: the trace determination coprocessor is configured to determine trace within a predetermined period of time when the touch panel has detected the second touch input; and when the trace determination coprocessor has determined that the second input trace matches the second switching trace, the processor switches from the first sub-operating state to the second sub-operating state, and the processor controls the display to display the corresponding operation interface.

4. The electronic device according to claim 1, wherein
the touch panel is configured on a first outer surface of the electronic device;
the electronic device further comprises:
a second panel configured to detect a second input on the first outer surface, which is independent on the states of the processor and the display,
triggering the processor and the display to perform state switching according to the first input comprises:
triggering the processor and the display to perform state switching according to the first input and the second input.

5. The electronic device according to claim 4, wherein
the second input is a press input,
the second panel is a pressure sensor configured to detect the pressure applied onto the touch panel by the press input, which is independent on the states of the processor and the display,
triggering the processor and the display to perform state switching according to the first input and the second input comprises:
triggering the processor and the display to perform state switching according to the first input and the pressure applied onto the touch sensing unit by the press input.

6. The electronic device according to claim 1, further comprises a microprocessor configured to initialize the display, the touch panel and a charging controller of the electronic device when an external power source connection is detected.

7. A state controlling method applied to an electronic device which comprises a display having a display state and a turn-off state, a processor having an operating state and a sleep state, and a touch panel configured to overlap the display, said state controlling method comprises: the touch panel detecting a first input, where the touch detects a first input when the display is in the turn-off state, where the touch panel detects a first input with a first input trace to be compared with a plurality of switching traces, which is independent on the states of the processor and the display, and the first input being a touch input; and triggering the processor and the display to perform state switching according to the first input,
wherein the first input comprises a first touch input, triggering the processor and the display to perform state switching according to the first input comprises: the processor switching from the sleep state to the operating state and the display switching from the turn-off state to the display state when the processor is in the sleep state while the display is in the turn-off state and the touch panel has detected a first touch input,
wherein the first input further comprise a second touch input, the operating state comprise a first sub-operating state and a second sub-operating state,
the processor switching from the sleep state to the operating state and the display switching from the turn-off state to the display state when the processor is in the sleep state while the display is in the turn-off state and the first touch input has been detected comprises:
the processor switching from the sleep state to the operating state and the display switching from the turn-off state to the display state so as to display the lock screen interface when the processor is in the sleep state while the display is in the turn-off state and the touch panel has detected the first touch input; and the processor switching from the first sub-operating state to the second sub-operating state and controlling the display to display a corresponding operation interface, when the touch panel has detected the second touch input within a predetermined period of time, wherein the processor executes a command of a first command set in the first sub-operating state and executes a command of a second command set in the second sub-operating state, and the number of the commands in the first command set is smaller than that in the second command set, wherein when the electronic device is in the sleep state or in the power-off state, the display is in the turn-off state, wherein when an external power source connection is detected, the processor initializes the display, the touch panel and a charging controller of the electronic device, and wherein when the electronic device is in the sleep state, the processor operates at a frequency lower than the normal operating frequency.

8. The method according to claim 7, further comprises: determining whether the first input trace of the first touch input matches a first switching trace when the processor is in the sleep state and the display is in the turn-off state and the touch panel has detected the first touch input, switching the processor from the sleep state to the operating state and switching the display from the turn-off state to the display state comprises: switching the processor from the sleep state to the operating state and switching the display from the turn-off state to the display state when it has been determined that the first input trace matches the first switching trace.

9. The method according to claim 7, wherein the processor switching from the first sub-operating state to the second sub-operating state and controlling the display to display a corresponding operation interface, when the touch panel has detected the second touch input within a predetermined period of time comprises: determining whether a second input trace of the second touch input matches a second switching trace when the touch panel has detected the second touch input within the predetermined period of time; and switching the processor from the first sub-operating state to the second sub-operating state and controlling the display to display the corresponding operation interface when it has been determined that the second input trace matches the second switching trace.

10. The method according to claim 7, wherein the electronic device further comprises a microprocessor, when the electronic device is in the power-off state and an external power source connection is detected, said method further comprises:

initializing the display, the touch and a charging controller of the electronic device by the microprocessor, where the processor ceases to operate when the electronic device is in the power-off state.

11. The electronic device according to claim 1, further comprises:

a battery configured to enter a charging state, when the display is in the turn-off state and an external power source connection has been detected;

a charging controller configured to acquire a charging progress information of the battery when the display is in the turn-off state and when the external power source connection has been detected;

wherein, when the external power source connection has been detected and the touch panel has detected the first input, the display switches from the turn-off state to the display state so as to display the charging progress information of the battery.

12. The method according to claim 7, wherein the electronic device further comprises a battery and a charging controller configured to acquire a charging progress information of the battery, and triggering the processor and the display to perform state switching according to the first input comprises the display switching from the turn-off state to the display state so as to display the charging progress information of the battery when an external power source connection has been detected and the touch panel has detected the first input.

* * * * *